(12) United States Patent
Chan

(10) Patent No.: US 10,582,809 B2
(45) Date of Patent: Mar. 10, 2020

(54) REMOVABLE HANDLE SYSTEM

(71) Applicant: Metier Atelier Co., Ltd., Kowloon (HK)

(72) Inventor: Chiu Hung Chan, Kowloon (HK)

(73) Assignee: Metier Atelier Co., Ltd., Kowloon (HK)

( * ) Notice: Subject to any disclaimer, the term of this patent is extended or adjusted under 35 U.S.C. 154(b) by 0 days.

(21) Appl. No.: 16/013,705

(22) Filed: Jun. 20, 2018

(65) Prior Publication Data

US 2019/0008329 A1 Jan. 10, 2019

(30) Foreign Application Priority Data

Jul. 10, 2017 (CN) .......................... 2017 1 0557217

(51) Int. Cl.
*A47J 45/07* (2006.01)
(52) U.S. Cl.
CPC .................................. *A47J 45/071* (2013.01)
(58) Field of Classification Search
CPC combination set(s) only.
See application file for complete search history.

(56) References Cited

U.S. PATENT DOCUMENTS

| | | | | |
|---|---|---|---|---|
| 2,073,475 A * | 3/1937 | Gordon | ................... | A47J 45/10 294/33 |
| 2,220,879 A | 11/1940 | Samuel et al. | | |
| 2,431,808 A * | 12/1947 | Kluit | ....................... | A47J 45/08 220/755 |
| 2,489,194 A * | 11/1949 | Pistey | ................... | A47J 43/287 220/735 |
| 2,703,908 A * | 3/1955 | Stracker | .................. | A47J 45/08 220/753 |
| 3,798,706 A * | 3/1974 | Wolfson | ................ | A47J 45/071 220/759 |
| 3,883,169 A * | 5/1975 | Fischbach | ............. | A47J 45/071 294/31.1 |
| 3,973,694 A * | 8/1976 | Tess | ....................... | A47J 27/092 220/203.06 |
| 4,083,081 A | 4/1978 | Witte | | |
| 4,577,367 A | 3/1986 | Durand | | |
| 6,260,733 B1 | 7/2001 | Eimerman | | |

(Continued)

*Primary Examiner* — Kareen K Thomas
(74) *Attorney, Agent, or Firm* — Schacht Law Office, Inc.; Dwayne Rogge

(57) ABSTRACT

Disclosed herein is a handle system comprising in one example: a grasping portion configured to be grasped by a user, the grasping portion also comprising a connecting end removably attached to a connector; the connecting end of the grasping portion comprising a fixed catch configured to mount the grasping portion to the connector so as to substantially maintain position of the grasping portion relative to the connector; the grasping portion comprising an inner surface forming a latch cavity; a pivot fulcrum within the latch cavity; a latch lever having an engagement portion, a catch portion, a fulcrum rest configured to maintain position of the latch lever on the pivot fulcrum; a button external of the grasping portion, the button configured to be actuated by a user; the button removably connected to the latch lever, wherein actuating the button rotates the latch lever, releasing the latch lever from the connector; and a biasing member biasing the latch lever to a latching position.

8 Claims, 4 Drawing Sheets

(56) References Cited

U.S. PATENT DOCUMENTS

| | | | |
|---|---|---|---|
| 6,439,421 B1 | 8/2002 | Lin | |
| 7,624,893 B2 * | 12/2009 | Hoff | ............... A47J 45/061 16/421 |
| 8,573,438 B1 | 11/2013 | Cheng | |
| 2005/0145637 A1 | 7/2005 | Lin | |

* cited by examiner

REMOVABLE HANDLE SYSTEM

RELATED APPLICATIONS

This application claims priority benefit of Chinese Patent Application No. 201710557217.6, filed Jul. 10, 2017, incorporated herein by reference.

FIELD OF THE DISCLOSURE

This disclosure relates to the field of handle systems utilizing a grasping handle for manipulation of a device such as cookware, pans, cups, storage apparatuses, tools, or other components.

BACKGROUND OF THE DISCLOSURE

Prior art removable handles for cookware and other components have been supplied, each attempting to securely attach a handle to the cookware and allow easy release.

BRIEF SUMMARY OF THE DISCLOSURE

Disclosed herein is a handle system comprising in one example: a grasping portion configured to be grasped by a user, the grasping portion also comprising a connecting end removably attached to a connector; the connecting end of the grasping portion comprising a fixed catch configured to mount the grasping portion to the connector so as to substantially maintain position of the grasping portion relative to the connector; the grasping portion comprising an inner surface forming a latch cavity; a pivot fulcrum within the latch cavity; a latch lever having an engagement portion, a catch portion, a fulcrum rest configured to maintain position of the latch lever on the pivot fulcrum; a button external of the grasping portion, the button configured to be actuated by a user; the button connected to the latch lever, wherein actuating the button rotates the latch lever, releasing the latch lever from the connector; and a biasing member biasing the latch lever to a latching position.

The system may be arranged wherein the button is substantially flush with a surrounding upper surface of the grasping portion.

The system may be arranged wherein the connector is fixed to cookware.

The system may be arranged wherein the removable handle comprises a top plate removably attached to a handle base.

The system may be arranged wherein the catch portion is longitudinally opposed to the engagement end of the latch lever The system may be arranged wherein the fulcrum rest is longitudinally between the catch portion and the engagement portion.

The system wherein the biasing member is an elastic member configured to bias the latch lever to a latching position.

The system may be arranged wherein the elastic member is a compression spring.

DETAILED DESCRIPTION OF THE DISCLOSURE

Figure 1:
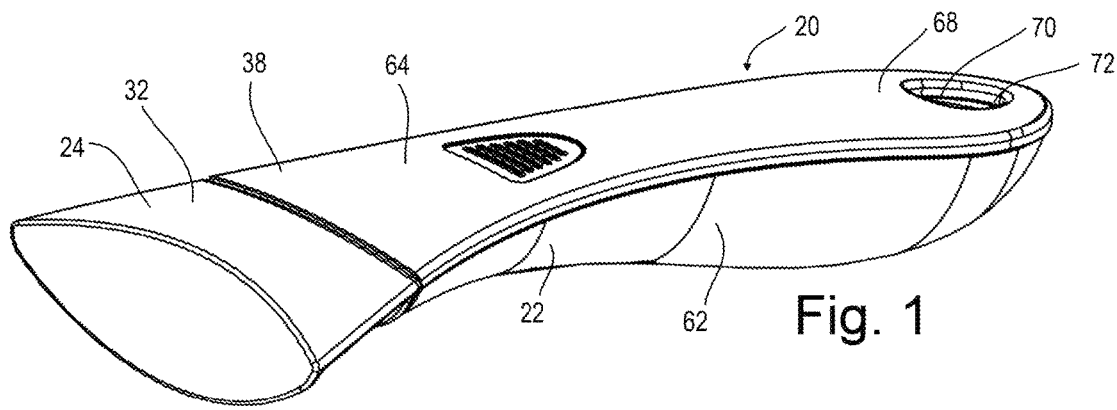
FIG. 1 is a side perspective view of one example of a removable handle and a connector component.

In the field of cookware and other fields, it is often desired to provide a grasping handle which is removably attached to the cookware main body so as to reduce cost, reduce storage requirements, reduce transportation volume, reduce weight of the overall systems etc. Thus, many different versions of removable handles and connecting devices are known in the art each having their own advantages and disadvantages. Disclosed herein is a removable handle system 20 configured to removably couple a grasping portion 22 to a connector 24. The removable handle system 20 specifically configured against accidental removal of the grasping portion 22 relative to the connector 24. In one example, the grasping portion 22 is not removable when the connector 24 and attached cookware is suspended from the grasping portion 22 in an upright position. The connector 24 in this example fixed to an article of cookware 26 or an equivalent component such as a cup, storage apparatus, tool, bucket, bowl, box, or other component. The term "cookware" will be used herein to encompass all of these for ease in description.

The connector 24 is generally a rigid component, and may be attached to an exterior wall 28 of the cookware 26 by way of an adhesive 30, screws, welding, brazing, rivets, or other methods and components.

Figure 11:
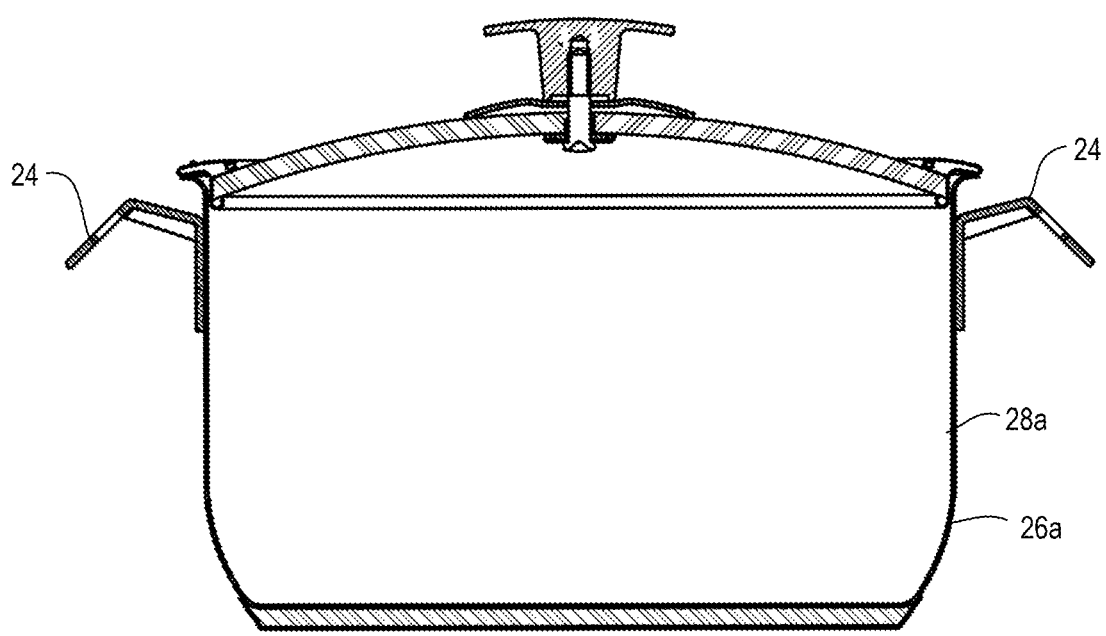
FIG. 11 is a side cutaway view of a first cookware utilizing the disclosed removable handle system.
Figure 12:
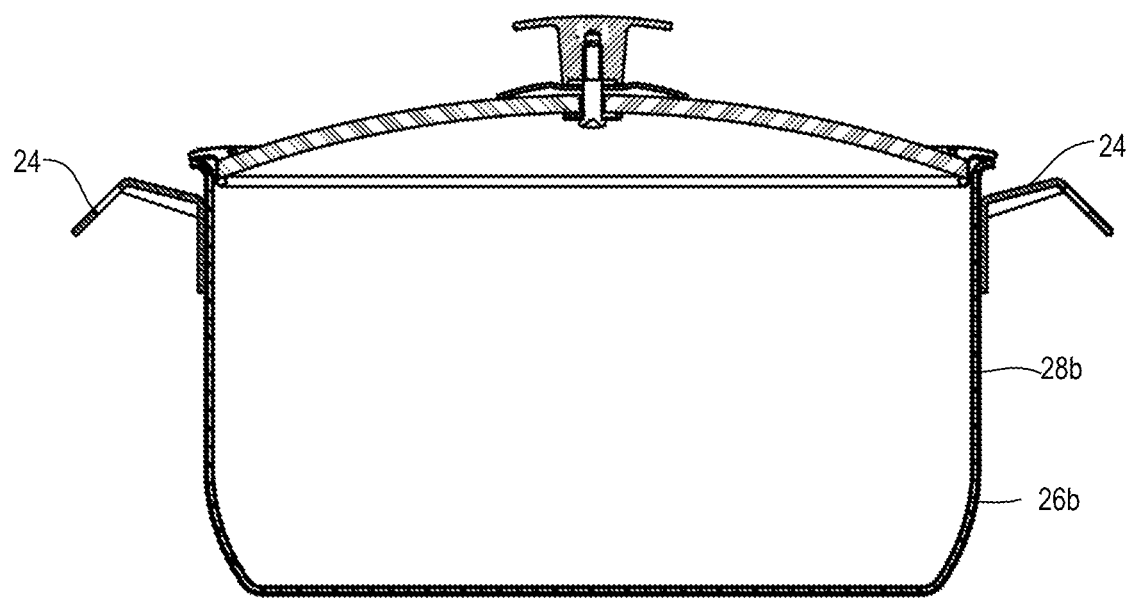
FIG. 12 is a side cutaway view of a second cookware utilizing the disclosed removable handle system.

In one example, multiple cookware 26 items may be envisioned, as shown in FIG. 11, 12 each with at least one connector 24 mounted thereto. Each cookware 26 (26a, 26b) utilizing the same grasping portion(s) 22 such that each cookware 26 need not have its own grasping portion 22. In other examples, multiple connectors 24 may be formed on a single item of cookware 26 such as on opposing longitudinal sides thereof as shown in FIG. 11, 12. In such an example, two or more grasping portions 22 may be simultaneously attached to the same item of cookware 26 for larger and/or heavier cookware, so as to more securely lift and manipulate the cookware 26. Such is shown in FIG. 11 depicting a side cutaway view of a first cookware 26a (sauce pot) having an outer wall 28a with a plurality of connectors 24 on opposing sides thereof. Such is shown in FIG. 11 depicting a side cutaway view of a second cookware 26b (casserole pot) having an outer wall 28b with a plurality of connectors 24 on opposing sides thereof.

Looking to FIG. 1 it can be seen that in this example the grasping portion 22 is firmly attached to the connector 24 and latched thereto. In this position, the grasping portion 22 is only removable from the connector 24 following releasing the latching system 36.

Figure 2:
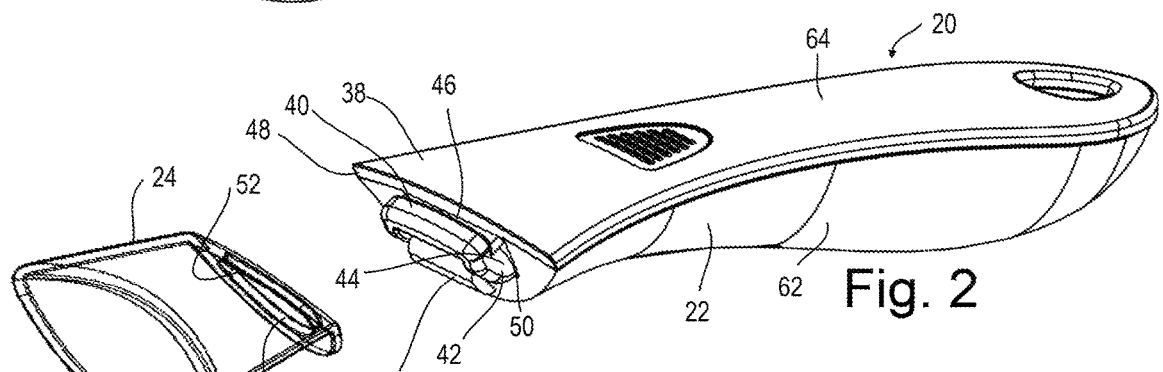
FIG. 2 is a partially exploded perspective view of the example shown in FIG. 1.

Looking to FIG. 2 it can be seen that the grasping portion 22 has been removed from the connector 24. This removal allowing for a reduction in storage/transportation space. The removable grasping portion 22 also allowing for cleaning of the cookware 26 without subjecting the grasping portion 22 to abrasives and cleaning materials which may detrimentally affect the mechanism there-within, as well as adding other advantages described herein. In FIG. 2, a top face 32 of the connector 24 is shown transparent so as to show the surfaces forming a grasping portion receiver 34 of the connector 24.

In one example, the connecting apparatus operates in two stages, the first stage is to attach the grasping portion 22 to the connector 24, and the second stage is to latch the grasping portion 22 to the connector 24 via the latching system 36. In this way, failure of the latching system 36 will not necessarily result in detachment of the grasping portion 22 from the connector 24. Such detachment, which otherwise may tend to result in dropping the cookware 26, is generally detrimental to operation.

In the example shown, the connecting end 38 (end closest to the cookware 26) comprises a fixed catch 40. The fixed catch of this example formed by a longitudinal protrusion 42 and a transverse protrusion 44 forming a groove 46 between the vertical protrusion 44 and a surface 48 of the grasping portion 22. In one example, a resting surface 50 of the fixed catch 40 engages an inner upper edge 52 of the receiver 34 most easily seen in FIG. 5. In one example, the resting surface 50 may be arcuate to conform to the arcuate upper edge 52 of the receiver 34. As shown, and more easily seen in FIG. 3, the resting surface 50 forms a pivot point about which the grasping portion 22 would tend to rotate relative to the cookware 26 when a substantial weight is placed in the cookware 26. The vertical protrusion 44 presses against an inner surface 54 which prohibits disengagement or rotation of the grasping portion 22 relative to the connector 24. Simultaneously, the grasping portion 22 when held in place results in a force along the vector 56 (FIG. 3) against the surface of the connector, further prohibiting rotation of the grasping portion 22 relative to the connector 24. In one example, the grasping portion receiver 34 is at an angle 58 relative to the outer wall 28 of the cookware 26. In one range, this angle is between 5° and 85° with a narrower range between 30 and 60° thus further enhancing the connection between the fixed catch 40 and the connector 24.

Given this arrangement, as the fixed catch 40 is inserted into the surface 60 defining an opening through the coupler 24 referred to as the grasping portion receiver 34, and then repositioned so as to engage the grooves 46 about the upper edge 52; the grasping portion 22 is attached to the connector 24, When so attached, the connector 24 and any associated component such as cookware 26 may be lifted or otherwise manipulated.

Wherein some manipulation may result in detachment of the grasping portion 22 from the coupler 24, a latching system 36 may also be utilized.

The grasping portion 22 may be formed of a handle base 62 and a top plate 64. In one example, the handle base 62 is removably coupled to the top plate 64 via a plurality of fasteners 66 such as threaded screws or bolts. In this disclosure, generic components are given a numeric label and specific examples may be given an identifying letter. For example, the fasteners are generally denoted with the numeric label 66 wherein specific examples are labeled 66a, 66b, and 66c. In the example shown in FIG. 3, the heads of the fasteners 66 are recessed into the grasping portion 22. Thus forming surfaces defining holes into which may be inserted a plug or cap 67 (67a-67c), thus forming a substantially smooth grasping surface. In one example each cap 67 may be formed of malleable material forming a friction fit within the hole. In one example, the malleable material is substantially silicone. Each cap 67 filling the hole into which is recessed a fastener 66, each cap 67 thus forming a smooth surface to the grasping portion 22. Where food or other contaminates may otherwise enter the recess void without the cap(s) 67, each cap 67 reduces the possibility of contaminates entering the voids, and thus reducing the possibility of contaminates being retained by the removable handle system 20.

Figure 5:
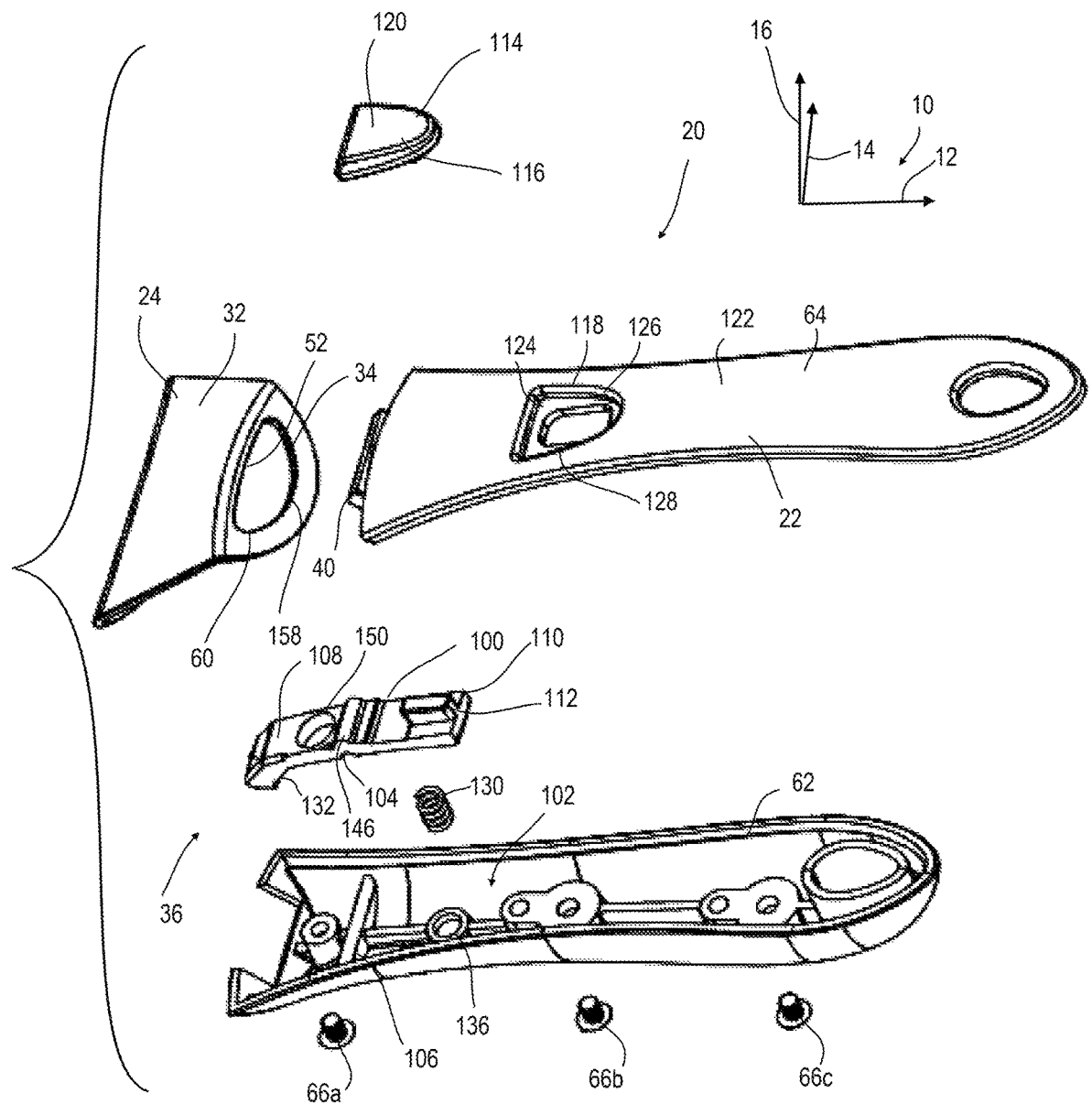
FIG. 5 is an exploded view of the example shown in FIG. 1.
Figure 6:
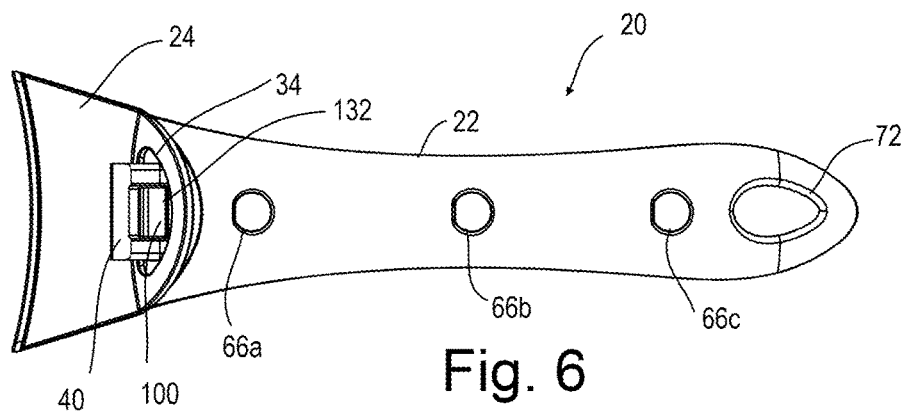
FIG. 6 is a bottom view of the example shown in FIG. 1.
Figure 7:
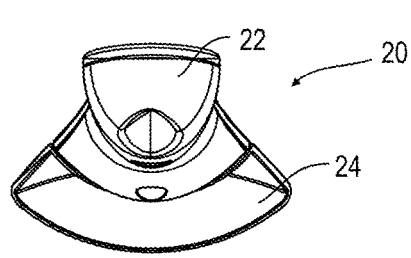
FIG. 7 is a first end view of the example shown in FIG. 1.
Figure 8:
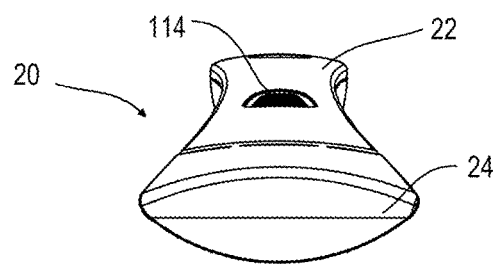
FIG. 8 is a second end view of the example shown in FIG. 1.
Figure 9:
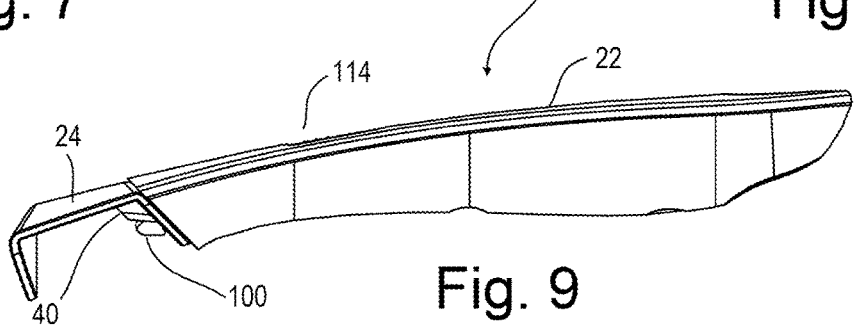
FIG. 9 is a side view of the example shown in FIG. 1 with the opposing side view being a mirror image thereof.
Figure 10:
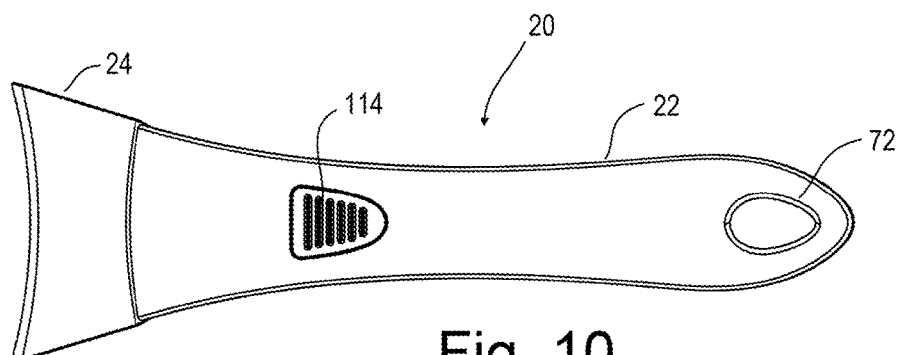
FIG. 10 is a top view thereof.

Before continuing, an axes system 10 is disclosed as shown in FIG. 5. This axes system comprising a longitudinal axis 12 substantially parallel to the long axis of the grasping portion 22. Also disclosed is a lateral axis 14, orthogonal to the longitudinal axis 12. Also disclose is a transverse axis 16 orthogonal to the longitudinal axis 12 and transverse axis 16.

In one example, the distal end 68 of the grasping portion 22 comprises a surface 70 defining an opening 72 (hole) through the grasping portion for hanging the grasping portion, attachment of a lanyard, or other purpose.

The latching system 36 in this example comprising a latch lever 100 fitted at least partially within a latch cavity 102 of the grasping portion 22.

Figure 3:
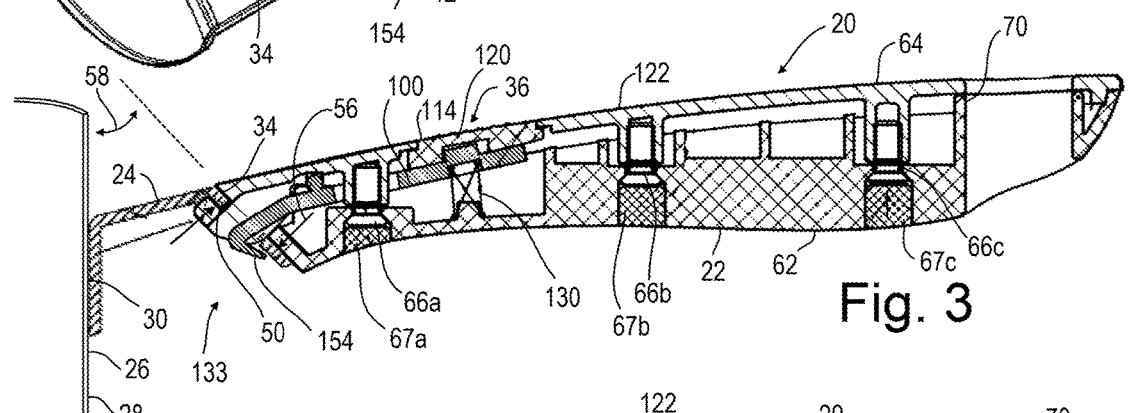
FIG. 3 is a side cutaway view of one example of a removable handle and a connector component attached to a cookware.

Comparing FIGS. 3 and 5 it can be seen that the latching system 36 of this example comprises the latch lever 100 having a fulcrum rest 104 which in this example generally comprises a notch in one transverse side of the latch lever 100. This fulcrum rest 104 rests upon a pivot fulcrum 106. The combination of the fulcrum rest 104 and the pivot fulcrum 106 allows for rotation of the latch lever 100 about the pivot fulcrum 106 relative to the grasping portion 22 in use. The latch lever 100 in this example comprising a catch portion 108 and an engagement portion 110. In this example, the engagement portion 110 comprises button receiver 112 which connects the latch lever 100 to a button 114. In one example, the button 114 has a notch 116 in the underside thereof into which fits the button receiver 112. Adhesive or other attachment methods may be used to affix the button 114 to the latch lever 100.

The button 114 in one example recesses at least partially within a button recess 118 of the top plate 64. In example shown in FIG. 3, the upper surface 120 of the button 114 is substantially flush with the upper surface 122 of the top plate 64. Such an example provides an aesthetically pleasing apparatus and reduces accidental engagement of the actuator or button 114. In the example shown in FIG. 4, the button 114 protrudes slightly from the upper surface 122 of the top plate 64 so as to be more easily distinguished and engaged to release the latching system 36.

Positioning the button 114 flush with the adjacent surface of the top plate 64 also decreases accidental actuation of the button 114. When the grasping portion 22 is grasped normally, in the upright orientation shown in FIG. 1-4 the button 114 is easily depressed below the adjacent top plate 64 surface by a user's thumb. When the connector 24 and attached cookware 28 is suspended from the grasping portion 22, the groove 46 maintains the cookware 26 and contents thereof connected to the handle 20. The grasping portion 20 must be moved in direction 142 relative to the connector 24 to release the handle. In an inverted position, the user's thumb will be transversely on the opposite side from the button 114 and thus the user's thumb cannot engage the button 114 when grasped normally. In examples where the button 114 does not transversely project from the adjacent surface of the grasping portion 22, it is unlikely that the button 114 will be actuated, and the connector 24 released.

In one example, the button recess 118 comprises side surfaces 124 and a bottom surface 126 with a surface defining a hole 128 there through. One example of the button receiver 112 engages the button 114 through this hole 128.

Figure 4:
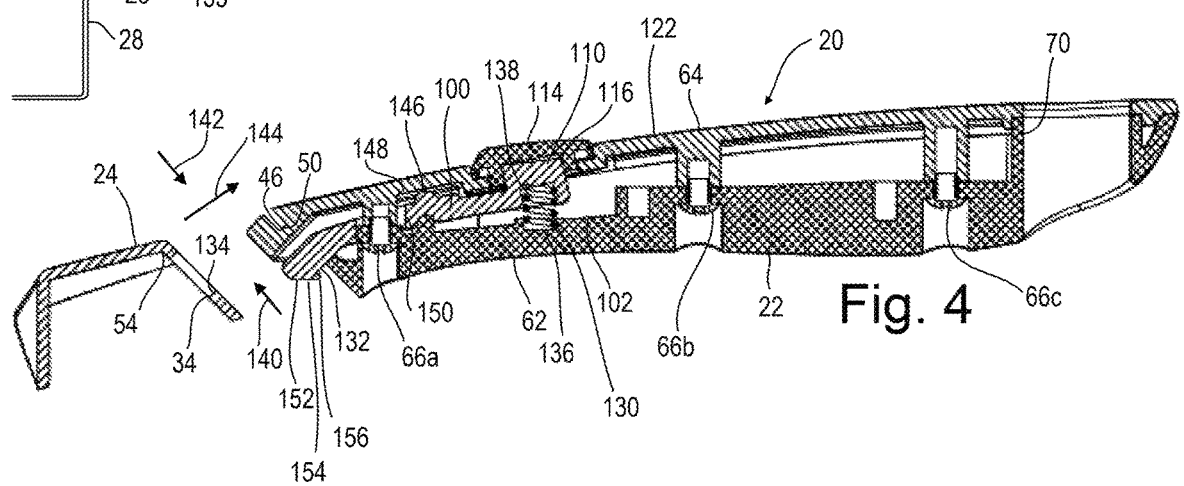
FIG. 4 is a side cutaway view of the example shown in FIG. 2 with a protruding button option.

Looking to FIG. 5 in combination with FIG. 3 and FIG. 4 it can be seen that an elastic member 130 may be provided to bias the latch lever 100 to the latching position 133 shown in FIG. 3 wherein the catch surface 132 of the latch lever 100 connects with a latch surface 134 of the connector 24 to prohibit removal of the grasping portion 22 from the connector 24 without engaging the button 114.

In the example shown, the elastic member 130 comprises a compression spring, although other materials and components can also be utilized. In one example, tension members could also be utilized rather than compression members, each falling into the definition of an elastic member.

Looking to FIG. 4 it can be seen that the elastic member 130 of this example is fitted into an elastic member receiver 136 of the handle base 62. Similarly, the latch lever 100 comprises an elastic member receiver 138. The elastic member 130 extending there between and in this example, compressing the elastic member 130 temporarily when the button 114 is engaged, rotating about the pivot fulcrum 106 to reposition the catch surface 132 in direction 140. This movement releasing the latching system 36 and allowing the grasping portion 22 to be repositioned in direction of travel 142, and then in direction of travel 144 releasing the grasping portion 22 from the connector 24.

In one example, as the latch lever 100 pivots about the pivot fulcrum 106, a surface 146 of the latch lever 100 contacts a surface 148 of the latch cavity 102, maintaining the latch lever 100 on the pivot fulcrum 106. In one example, the surface 146 of the latch lever 100 slides on the surface 148.

In one example, the pivot fulcrum 106, fulcrum rest 104, or component inserted therebetween is elastic in compression. This elastic component biasing the surface 146 of the latch lever 100 against the surface 148 of the latch cavity.

FIG. 5 also shows a surface defining a void 150 through the latch lever 100. In one example, shown in FIG. 4, the fastener 66a passes through this void 150 as it connects the handle base 62 to the top plate 64. Thus, the fastener 66a maintains position of the latch lever 100 to the grasping portion 22 as the latch lever 100 pivots.

In one example, as shown in FIG. 4, one end 152 of the latch arm 100 comprises a bevel 154 such that as the latching system 36 is engaged to the grasping portion receiver 34 of the connector 24, the bevel 154 biases the latch lever 100 in direction 140 until the seer edge 156 of the catch surface 132 passes the edge 158 of the grasping portion receiver 34, whereupon the pressure of the elastic member 130 biases the latch lever 100 to the latching position 133.

While the present invention is illustrated by description of several embodiments and while the illustrative embodiments are described in detail, it is not the intention of the applicants to restrict or in any way limit the scope of the appended claims to such detail. Additional advantages and modifications within the scope of the appended claims will readily appear to those sufficed in the art. The invention in its broader aspects is therefore not limited to the specific details, representative apparatus and methods, and illustrative examples shown and described. Accordingly, departures may be made from such details without departing from the spirit or scope of applicants' general concept. The invention illustratively disclosed herein suitably may be practiced in the absence of any element which is not specifically disclosed herein.

The invention claimed is:

1. A handle system comprising:
a grasping portion configured to be grasped by a user;
the grasping portion comprising a connecting end removably attached to a connector;
the connecting end of the grasping portion comprising a fixed catch configured to mount the grasping portion to the connector so as to substantially maintain position of the grasping portion relative to the connector;
the grasping portion comprising an inner surface forming a latch cavity;
a pivot fulcrum within the latch cavity;
a latch lever having an engagement portion, a catch portion, a fulcrum rest configured to maintain position of the latch lever on the pivot fulcrum;
a button external of the grasping portion, the button configured to be actuated by the user;
the button connected to the latch lever, wherein actuating the button rotates the latch lever, releasing the latch lever from the connector; and
an elastic member biasing the latch lever toward a latched position.

2. The system as recited in claim 1 wherein the button is substantially flush with a surrounding upper surface of the grasping portion.

3. The system as recited in claim 1 wherein the connector is fixed to cookware.

4. The system as recited in claim 1 wherein the removable handle comprises a top plate removably attached to a handle base.

5. The system as recited in claim 1 wherein the catch portion is longitudinally opposed to the engagement end of the latch lever.

6. The system as recited in claim 5 wherein the fulcrum rest is longitudinally between the catch portion and the engagement portion.

7. The system as recited in claim 1 wherein the biasing member is an elastic member configured to bias the latch lever to a latching position.

8. The system as recited in claim 7 wherein the elastic member is a compression spring.

* * * * *